United States Patent
Al-Sinan

(10) Patent No.: US 12,211,286 B2
(45) Date of Patent: Jan. 28, 2025

(54) AUTONOMOUS LOW-ALTITUDE UAV DETECTION SYSTEM

(71) Applicant: Mazen A. Al-Sinan, Dhahran (SA)

(72) Inventor: Mazen A. Al-Sinan, Dhahran (SA)

( * ) Notice: Subject to any disclaimer, the term of this patent is extended or adjusted under 35 U.S.C. 154(b) by 0 days.

(21) Appl. No.: 17/591,757

(22) Filed: Feb. 3, 2022

(65) Prior Publication Data

US 2023/0222809 A1 Jul. 13, 2023

(51) Int. Cl.
| | |
|---|---|
| *G06V 20/58* | (2022.01) |
| *B64C 39/02* | (2023.01) |
| *B64D 47/08* | (2006.01) |
| *G06V 10/74* | (2022.01) |
| *B64D 27/353* | (2024.01) |
| *B64U 10/30* | (2023.01) |
| *B64U 50/19* | (2023.01) |
| *B64U 101/30* | (2023.01) |

(52) U.S. Cl.
CPC .......... *G06V 20/58* (2022.01); *B64C 39/024* (2013.01); *B64D 47/08* (2013.01); *G06V 10/761* (2022.01); *B64B 2201/00* (2013.01); *B64D 27/353* (2024.01); *B64U 10/30* (2023.01); *B64U 50/19* (2023.01); *B64U 2101/30* (2023.01)

(58) Field of Classification Search
CPC .... G06V 20/58; G06V 10/761; B64C 39/024; B64D 47/08; B64D 2211/00; B64B 2201/00; B64U 10/30; B64U 50/19; B64U 2101/30
USPC ........................................................ 382/103
See application file for complete search history.

(56) References Cited

U.S. PATENT DOCUMENTS

| | | | | |
|---|---|---|---|---|
| 10,467,891 B1* | 11/2019 | Bart | ...................... | B64C 39/024 |
| 2014/0032034 A1* | 1/2014 | Raptopoulos | ........ | G05D 1/0088 |
| | | | | 701/25 |
| 2014/0136414 A1* | 5/2014 | Abhyanker | .......... | G05D 1/0255 |
| | | | | 701/25 |
| 2017/0092138 A1* | 3/2017 | Trundle | .................. | F41H 11/00 |
| 2018/0107182 A1* | 4/2018 | Mohamadi | ............ | G06V 10/82 |
| 2019/0067812 A1* | 2/2019 | Abuasabeh | ......... | G06F 3/04812 |
| 2020/0062392 A1* | 2/2020 | Yoon | ...................... | B64U 10/60 |

(Continued)

FOREIGN PATENT DOCUMENTS

| | | | | | |
|---|---|---|---|---|---|
| BR | 112021010366 | * | 8/2021 | ......... | B64C 29/0033 |
| CN | 112925044 | * | 6/2021 | ............. | G01W 1/08 |

(Continued)

*Primary Examiner* — Jerome Grant, II
(74) *Attorney, Agent, or Firm* — Maschoff Brennan

(57) ABSTRACT

An autonomous unmanned aerial vehicle detecting system for monitoring a geographic area includes an unmanned blimp adapted to hover in air, at least one camera mounted on the blimp to scan at least a portion of the geographic area, a location sensor to determine a location of the blimp, and a controller arranged in communication with blimp, the at least one camera, and the location sensor. The controller is configured to position the blimp at a desired location in the air based on inputs received from the location sensor, and monitor the geographic area based on the images received from at least one camera. The controller is also configured to detect a presence of an unmanned aerial vehicle within the geographic area based on the received images, and determine whether the detected unmanned aerial vehicle is an unauthorized unmanned aerial vehicle based on the received images.

2 Claims, 3 Drawing Sheets

(56) References Cited

U.S. PATENT DOCUMENTS

| | | | | |
|---|---|---|---|---|
| 2020/0186964 | A1* | 6/2020 | Lekutai | G08G 1/161 |
| 2021/0312640 | A1* | 10/2021 | Smith | G06V 10/62 |
| 2021/0407305 | A1* | 12/2021 | Jordan | G08G 5/0013 |
| 2022/0122391 | A1* | 4/2022 | Carter | G08B 13/1965 |
| 2022/0214144 | A1* | 7/2022 | Indelicato | G01S 17/86 |

FOREIGN PATENT DOCUMENTS

| | | | | |
|---|---|---|---|---|
| CN | 111959768 | * | 10/2021 | B64C 39/02 |
| JP | 2017165195 | * | 9/2017 | |
| JP | 2022501247 | * | 1/2022 | B64D 27/24 |
| KR | 20200120221 | * | 10/2020 | B64C 39/024 |
| WO | WO2016154945 | * | 10/2016 | |
| WO | WO2017161386 | * | 9/2017 | G08G 5/00 |
| WO | WO2019067695 | * | 4/2019 | B64C 30/02 |
| WO | WO202085239 | * | 4/2020 | G08G 5/00 |
| WO | WO2020085229 | * | 4/2020 | G01C 21/24 |

* cited by examiner

AUTONOMOUS LOW-ALTITUDE UAV DETECTION SYSTEM

CROSS-REFERENCE TO RELATED APPLICATION

The present application is based on, and claims priority from, Saudi Arabia application number SA122430536, filed Jan. 12, 2022, the disclosure of which is hereby incorporated by reference herein in its entirety.

TECHNICAL FIELD

The present disclosure relates, generally, to an unmanned aerial vehicle detecting system. More particularly, the present disclosure pertains to an autonomous unmanned aerial vehicle detecting system having at least one unmanned blimp to monitor and detect any unauthorized unmanned aerial vehicle in an airspace.

BACKGROUND

Unmanned aerial vehicles (UAVs), for example, drones typically pose public safety and privacy concerns as the drone can be used to perform unauthorized aerial surveillance. For example, drones may be used to capture unauthorized video footage in areas within a property, which is undesirable.

SUMMARY

According to an aspect of the disclosure an autonomous unmanned aerial vehicle detecting system for monitoring a geographic area is disclosed, the unmanned aerial vehicle detecting system includes an unmanned blimp adapted to hover in air and including a plurality of propellers and a plurality of electric motors to drive the plurality of propellers. The detecting system further includes at least one camera mounted on the unmanned blimp and adapted to scan at least a portion of the geographic area. The detecting system also includes a location sensor disposed on the unmanned blimp and configured to determine a location of the unmanned blimp, and a controller arranged in communication with the plurality of electric motors, the at least one camera, and the location sensor. The controller is configured to control the plurality of electric motors to move and position the unmanned blimp at a desired location in the air based on inputs received from the location sensor. The desired location includes a desired altitude. The controller is also configured to monitor the geographic area based on the images received from at least one camera and detect a presence of an unmanned aerial vehicle within the geographic area based on the images received from the at least one camera. Moreover, the controller is configured to determine whether the detected unmanned aerial vehicle is an unauthorized unmanned aerial vehicle based on the images received from the at least one camera.

In some embodiments, the at least one camera is adapted to capture a bird eye view of the geographic area.

In some embodiments, wherein at least one camera includes a plurality of cameras to capture 360 degrees view of the geographic area surrounding the unmanned aerial vehicle.

In some embodiments, the controller is also configured to generate an image signature of the detected unmanned aerial vehicle from the images received from the at least one camera. Moreover, the controller is configured to determine the detected unmanned aerial vehicle as an unauthorized unmanned aerial vehicle based on the generated image signature.

In some embodiments, the unmanned aerial vehicle detecting system further includes a database storing a plurality of image signatures corresponding to a plurality of authorized unmanned aerial vehicles.

In some embodiments, the controller is configured to access the database to access one or more image signatures that are each associated with a respective authorized unmanned aerial vehicle, and compare, by using a trained machine learning model, the image signature of the detected unmanned aerial vehicle with one or more image signatures that are each associated with a respective authorized unmanned aerial vehicle. The controller is further configured to identify, by using the trained machine learning model, the detected unmanned aerial vehicle as an unauthorized unmanned aerial vehicle when the generated image signature of the detected unmanned aerial vehicle is different from the plurality of image signatures associated with the plurality of authorized unmanned aerial vehicles.

In some embodiments, the controlled is configured to generate an alarm in response to the determination of the detected unmanned aerial vehicle being an unauthorized unmanned aerial vehicle.

In some embodiments, the controller is located at a ground based central station and the unmanned aerial vehicle detecting system further includes a communication device to share a data from the at least one camera and the location sensor to the controller.

In some embodiments, the controller is configured to determine a location and a velocity of the detected unmanned aerial vehicle based on the images received from the at least one camera.

In some embodiments, the unmanned blimp includes a solar mesh adapted to generate solar electric power to power the unmanned blimp, the at least one camera, the electric motors, and the location sensor.

In some embodiments, the unmanned blimp includes a valve to control a discharge of a gas from the unmanned blimp. The controller is configured to control an opening and a closing of the valve.

According to an aspect of the disclosure, a method for monitoring a geographic area. The method includes positioning an unmanned blimp at a desired location in the air. The desired location includes a desired altitude, and the unmanned blimp includes a plurality of propellers and a plurality of electric motors to drive the plurality of propellers. The method further includes scanning, by at least one camera mounted on the unmanned blimp, the geographic area, and monitoring, by a controller, the geographic area based on the images received from at least one camera. The method also includes detecting, by the controller, a presence of an unmanned aerial vehicle within the geographic area based on the images received from the at least one camera, and determining, by the controller, whether the detected unmanned aerial vehicle is an unauthorized unmanned aerial vehicle based on the images received from the at least one camera.

In some embodiments, the at least one camera is adapted to capture a bird eye view of the geographic area.

In some embodiments, at least one camera includes a plurality of cameras to capture 360 degrees view of the geographic area surrounding the unmanned aerial blimp.

In some embodiments, determining whether the detected unmanned aerial vehicle is an unauthorized unmanned aerial vehicle includes generating an image signature of the detected unmanned aerial vehicle from the images received from the at least one camera, and determining the detected unmanned aerial vehicle as an unauthorized unmanned aerial vehicle based on the generated image signature.

In some embodiments, determining the detected unmanned aerial vehicle as an unauthorized unmanned aerial vehicle based on the generated image signature includes accessing, by the controller, a database to access one or more image signatures that are each associated with a respective authorized unmanned aerial vehicle, and comparing, by the controller via a trained machine learning model, the image signature of the detected unmanned aerial vehicle with one or more image signatures that are each associated with a respective authorized unmanned aerial vehicle. Moreover, the method includes identifying, by the controller via the trained machine learning model, the detected unmanned aerial vehicle as an unauthorized unmanned aerial vehicle when the generated image signature of the detected unmanned aerial vehicle is different from the plurality of image signatures associated with the plurality of authorized unmanned aerial vehicles.

In some embodiments, the method also includes generating, by a controller, an alarm in response to the determination of the detected unmanned aerial vehicle being an unauthorized unmanned aerial vehicle.

In some embodiments, the method further includes determining a location and a velocity of the detected unmanned aerial vehicle based on the images received from the at least one camera.

In some embodiments, positioning the unmanned blimp at the desired location in the air includes controlling the plurality of motors to move the unmanned blimp based on data received from a location sensor.

In some embodiments, the method further includes controlling, by the controller, a descending of the unmanned blimp by controlling an opening of a valve to control a discharge of a gas from the unmanned blimp.

DETAILED DESCRIPTION

Figure 1:
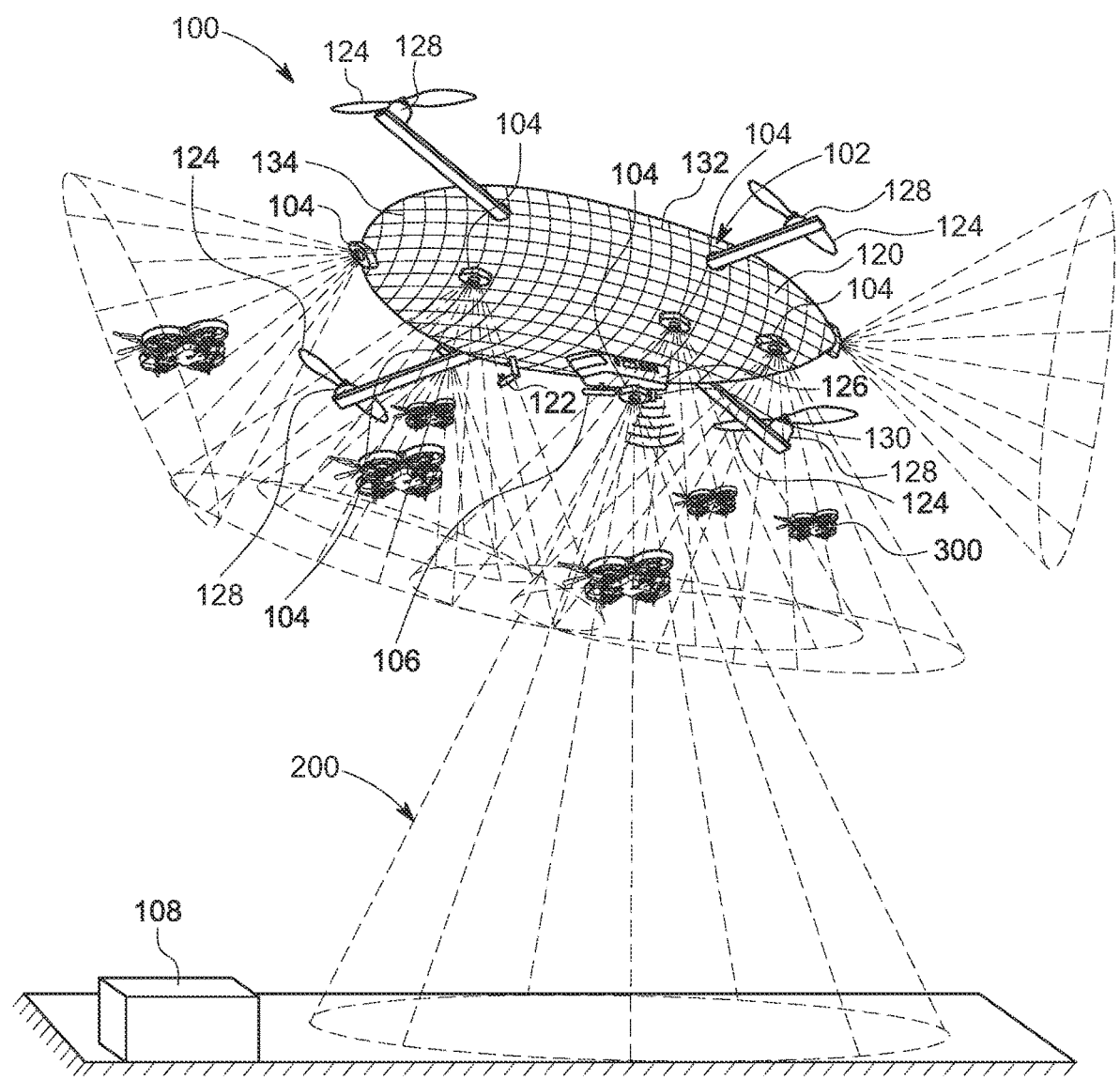
FIG. 1 illustrates a schematic view of an autonomous unmanned air vehicle detecting system having a plurality of camera positioned on a blimp, in accordance with an embodiment of the disclosure.

Example embodiments are described below with reference to the accompanying drawings. Unless otherwise expressly stated in the drawings, the sizes, positions, etc., of components, features, elements, etc., as well as any distances therebetween, are not necessarily to scale, and may be disproportionate and/or exaggerated for clarity.

The terminology used herein is for the purpose of describing particular example embodiments only and is not intended to be limiting. As used herein, the singular forms "a," "an" and "the" are intended to include the plural forms as well, unless the context clearly indicates otherwise. It should be recognized that the terms "comprise." "comprises," and/or "comprising." when used in this specification, specify the presence of stated features, integers, steps, operations, elements, and/or components, but do not preclude the presence or addition of one or more other features, integers, steps, operations, elements, components, and/or groups thereof. Unless otherwise specified, a range of values, when recited, includes both the upper and lower limits of the range, as well as any sub-ranges therebetween. Unless indicated otherwise, terms such as "first," "second." etc., are only used to distinguish one element from another. For example, one element could be termed a "first element" and similarly, another element could be termed a "second element," or vice versa. The section headings used herein are for organizational purposes only and are not to be construed as limiting the subject matter described.

Unless indicated otherwise, the terms "about." "thereabout," "substantially," etc. mean that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art.

Spatially relative terms, such as "right." left," "below," "beneath," "lower." "above," and "upper," and the like, may be used herein for ease of description to describe one element's or feature's relationship to another element or feature, as illustrated in the drawings. It should be recognized that the spatially relative terms are intended to encompass different orientations in addition to the orientation depicted in the figures. For example, if an object in the figures is turned over, elements described as "below" or "beneath" other elements or features would then be oriented "above" the other elements or features. Thus, the term "below" can, for example, encompass both an orientation of above and below. An object may be otherwise oriented (e.g., rotated 90 degrees or at other orientations) and the spatially relative descriptors used herein may be interpreted accordingly.

Unless clearly indicated otherwise, all connections and all operative connections may be direct or indirect. Similarly, unless clearly indicated otherwise, all connections and all operative connections may be rigid or non-rigid.

Like numbers refer to like elements throughout. Thus, the same or similar numbers may be described with reference to other drawings even if they are neither mentioned nor described in the corresponding drawing. Also, even elements that are not denoted by reference numbers may be described with reference to other drawings.

Many different forms and embodiments are possible without deviating from the spirit and teachings of this disclosure and so this disclosure should not be construed as limited to the example embodiments set forth herein. Rather, these example embodiments are provided so that this disclosure will be thorough and complete, and will convey the scope of the disclosure to those skilled in the art.

Reference in this specification to "one embodiment" or "an embodiment" means that a particular feature, structure, or characteristic described in connection with the embodiment is included in at least one embodiment of the present disclosure. The appearance of the phrase "in one embodiment" in various places in the specification are not necessarily all referring to the same embodiment, nor are separate or alternative embodiments mutually exclusive of other embodiments.

As used herein, the term "controller" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Referring to FIG. 1, an autonomous unmanned aerial vehicle detecting system 100 (hereinafter simply referred to as monitoring system 100) suitable for monitoring a geographic area (i.e., an airspace 200), and detect an intrusion of any unauthorized unmanned aerial vehicle (UAV), for example, an unauthorized drone, in the airspace 200 is shown. The system 100 includes an unmanned blimp 102 (hereinafter referred to as blimp 102) adapted to be arranged at a desired altitude, at least one camera 104 mounted on the blimp 102, a location sensor 106 mounted on the blimp 102 and adapted to determine a location of the blimp 102, and a controller 108 arranged in the ground and in communication with the blimp 102, the at least one camera 104, and the location sensor 106 to monitor one or more UAVs 300 in the airspace 200 and determine the intrusion of any unauthorized UAV in the airspace 200.

As shown, the blimp 102 includes a balloon shaped structure 120 filling with a gas, for example, helium, to enable a lifting of the blimp 102 in the air and positioning of the blimp 102 at the desired altitude, and a valve 122 adapted to control a discharge of the gas from the balloon 120 to control the altitude of the blimp 102 from the ground. In an embodiment, an opening and a closing of the valve 122 is controlled by the controller 108. To facilitate the opening and closing of the valve 122 by the controller 108, the valve 122 may be an electrically actuated valve. For example, the valve 122 may be an electromechanical valve, an electropneumatic valve, an electrohydraulic valve, or any other suitable electrically actuated valve. Although the electrically actuate valve 122 is contemplated, it may be envisioned that the valve 122 may be a mechanically actuated valve, a hydraulically actuated valve, or a pneumatically actuated valve.

Further, the blimp 102 includes a plurality of propellers 124 (for example, four propellers 124) connected to a platform structure 126 supported by the balloon 120 to propel the blimp 102 in a forward, a rearward, or sidewards directions to position the blimp 102 at a desired location. To operate the propellers 124, the blimp 102 includes a plurality of electric motors 128 operatively connected to the plurality of propellers 124 to operate or rotate the propellers 124. As shown, each motor 128 is associated with one propeller 124 and operates the connected propeller 124. Further, the electric motors 128 are operatively connected to the controller 108, and the controller 108 controls the operations of each motor 128 to position the blimp 102 at the desired location/coordinates at the desired altitude.

To power the electric motors 128 and/or other components, for example, the at least one camera 104, the location sensor 106, and/or a communication device 130, of the system 100, the blimp 102 may include a power source 132. In an embodiment, the power source 132 may be a solar mesh 134 arranged on an outer surface of the balloon 120 and adapted to convert solar power into electricity. Such generated electricity is either provided directly to the electric motors 128 and other components of the system 100 and/or stored inside an energy storage device, for example, a battery mounted on the blimp 102, and then transferred to the blimp 102 and other components of the system 100. To control the transfer of electricity to various components of the system 100, suitable hardware is mounted on the blimp 102.

Figure 2:
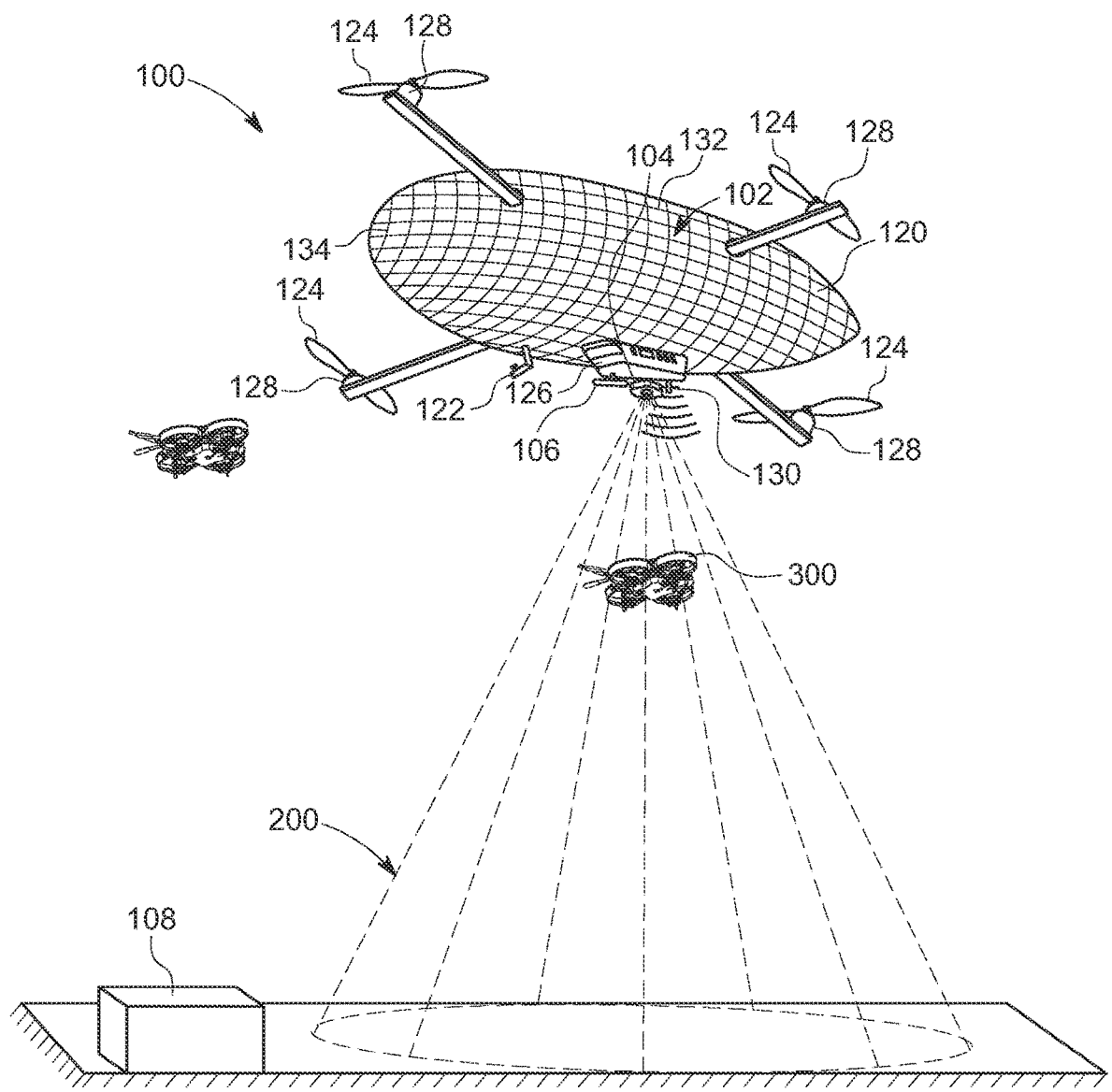
FIG. 2 illustrates a schematic view of an autonomous unmanned air vehicle detecting system having a single camera positioned on a blimp, in accordance with an embodiment of the disclosure.

As shown in FIG. 1, multiple cameras 104 are shown to be mounted on the blimp 102 to capture 360 degrees view of an area surrounding the blimp 102. In an embodiment, the cameras 104 are arranged such that the angle of view of the cameras 104 are inclined towards ground relative to a horizontal plane. Accordingly, the cameras 104 are configured to capture a bird eye view and/or 3-dimensional view of the airspace 200 to be monitored. In an embodiment, each camera 104 may rotate between a first position and a second position around a vertical axis. In some embodiments, the cameras 104 are stationary. In an embodiment, the system 100 may include a single camera 104 (as shown in FIG. 2) supported on the platform 126 and looking downward such that a field of view of the camera 104 includes a shape of 3-dimensional cone and is able to capture a bird eye of the airspace 200 to be monitored. The camera 104 may rotate about a vertical axis. In an embodiment, the at least one camera 104 may be a video camera to capture a video the airspace 200 to provide a plurality of frames of images, or an image capturing camera suitable to capture images of the airspace 200. In an embodiment, the camera 104 may be a lidar based camera or a radar, or an infrared camera. The camera 104 is in communication with the controller 108 and is configured to share the captured images of the airspace 200 with the controller 108 in real time.

To facilitate a data exchange between the at least one camera 104 and the controller 108, the system 100 includes the communication device 130, for example, a transceiver, mounted on the blimp 102. In an embodiment, the communication device 130 may transmit and/or receive a plurality of analog signals or a plurality of digital signals for facilitating the wireless communication of the communication device 130 with the controller 108. The controller 108 also shares the control signals or data with the electric motors 128 and the valve 122 through the communication device 130.

Further, the location sensor 106 also exchanges data with the controller 108 via the communication device 130. In the embodiment, the location sensor 106 shares the location coordinates of the blimp 102 to the controller 108 in real time. In an embodiment, the location sensor 106 may be a geo-positioning sensor (GPS sensor), or any other similar sensor known in the art to facilitate a determination of the location coordinates of the blimp 102 in the real time. Although a single communication device 130 is shown and contemplated, it may be appreciated that the cameras 104, the location sensor 106, the electric motors 128, and the valve 122, each may have independent communication device to facilitate a communication and the data exchange with the controller 108. Based on the location data, the controller 108 is configured to control the electric motors 128 and/or the valve 122 to position the blimp 102 at the desired location in the air such that the cameras 104 may scan and capture the images of the entire geographic area or airspace 200 to be monitored.

In an embodiment, the controller 108 is arranged or located at a ground-based station and includes a transceiver to exchange data with the communication device 130 mounted on the blimp 102. Although the controller 108 arranged on the ground station is shown and contemplated, it may be envisioned that the controller 108 may be located on the blimp 102. The controller 108 is configured to determine a presence of one or UAVs 300 in the airspace 200 and determine whether the unmanned aerial vehicle 300 is an authorized unmanned aerial vehicle or an unauthorized unmanned aerial vehicle. For so doing, the controller 108 is in communication with the at least one camera 104.

Figure 3:
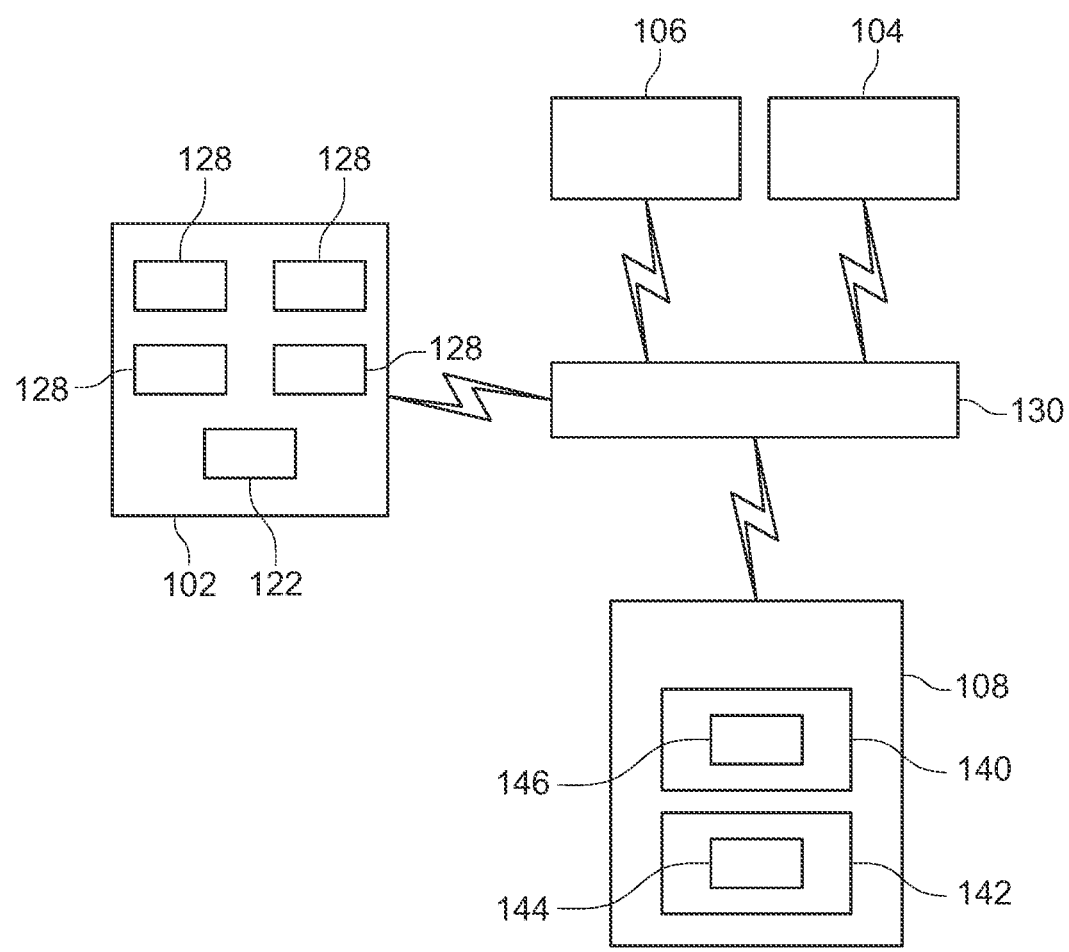
FIG. 3 illustrates a block diagram of the unmanned air vehicle detecting system, in accordance with an embodiment of the disclosure.

Referring to FIG. 3, the controller 108 may include a processor 140 for executing specified instructions, which controls and monitors various functions associated with the blimp 102 and the system 100. The processor 140 may be operatively connected to a memory 142 for storing instructions related to the control of the system 100 and components of the system 100. In an embodiment, the memory 142 may also store various events performed during the operations of the system 100.

The memory 142 as illustrated is integrated into the controller 108, but those skilled in the art will understand that the memory 142 may be separate from the controller 108 but onboard the ground station, and/or remote from the controller 108, while still being associated with and accessible by the controller 108 to store information in and retrieve information from the memory 142 as necessary during the operation of the system 100. Although the processor 140 is defined, it is also possible and contemplated to use other electronic components such as a microcontroller, an application specific integrated circuit (ASIC) chip, or any other integrated circuit device may be used for preforming the similar function. Moreover, the controller 108 may refer collectively to multiple control and processing devices across which the functionality of the system 100 may be distributed. For example, the location sensor 106, the communication device 130, the cameras 104, the electric motors 128, and the valve 122, may each have one or more controllers that communicate with the controller 108.

In an embodiment, the processer 140 is adapted to detect a presence of an UAV inside the airspace 200 by analyzing the images received from the cameras 104. In an embodiment, the processor 140 may perform a frame-by-frame analysis of the video being received from the cameras 104 to detect a presence of an unmanned aerial vehicle 300 in the airspace 200.

In an embodiment, the controller 108 may include a trained machine learning model 146 (shown in FIG. 3) adapted to identify one or more attributes of the detected UAV 300 detected inside the airspace 200 to determine whether the detected UAV 300 is an authorized UAV and an unauthorized UAV. In an embodiment, the one or more attributes includes a shape, one or more dimensions, etc., of the UAV 300. In an embodiment, the machine learning model 146 is trained to identify the one or more attributes of the detected UAV 300 from the images of the detected UAV 300. The machine learning model 146 is also trained to ascertain whether the one or more attributes correspond to any of the authorized UAVs and accordingly determine whether the detected UAV 300 is an authorized UAV or an unauthorized UAV. In an embodiment, the machine learning model 146 may generate an image signature of the detected UAV 300 based on the images received from the cameras 104 and identify the attributes from the generated image signature. In an embodiment, the machine learning model 146 may be a neural network-based model, a random forest-based model, a support vector machines-based model, a k-nearest neighbors algorithm based model, a symbolic regression based model, or any other such model known in the art.

In an embodiment, the machine learning model 146 facilitates a comparison of the image signature of the detected UAV 300 with the images of the authorized UAVs and determination whether the detected UAV 300 is one of the authorized UAVs or an unauthorized UAV. To do so, the controller 108 may include a database 144 storing a plurality of image signatures for the plurality of authorized UAVs. In an embodiment, the database 144 may store a plurality of image signatures corresponding to each authorized UAVs.

The processor 140 by using the trained machine learning model 146 is adapted to determine the detected UAV 300 as the unauthorized UAV if the machine learning model 146 determines that the image signature of the detected UAV 300 does not match with the image signatures of the plurality of authorized UAVs stored in the database 144. Further, the processor 140 is configured to generate an alarm, visual and/or audible, upon detection of an unauthorized UAV. Also, the processor 140 is configured to determine a location and a speed of the detected UAV 300 based on the images captured by the cameras 104. Additionally, or optionally, the processor 140 may store the information related to the detected UAV 300 in the memory 142 for later retrieval. Moreover, the processor 140 may detect a malfunctioning of one or more components of the system 100 mounted on the blimp 102 or the blimp 102 itself, and may open the valve 122 to facilitate a discharge to gas from the balloon 120 to bring the blimp 102 to the ground for repair and diagnostic purpose.

A method for monitoring the airspace 200 is now described. The method includes positioning the blimp 102 at the desire location including the desire altitude in the airspace 200. The desired location is selected such that the cameras 104 mounted on the blimp 102 scan and capture images of the entire airspace 200 to be monitored. In an embodiment, a plurality of blimps 102 may be positioned at various locations in the air to monitor the airspace 200 if the airspace 200 is large enough to be covered by a single blimp 102.

For positioning the blimp 102 at the desired location, the processor 140 may receive the location coordinates of the blimp 102 from the location sensor 106, and controls the electric motors 128 to control the propellers 124 and/or an opening and closing of the valve 122 to move the blimp 102 at the desired location including the desired altitude. After positioning the blimp 102 at the desired location, the cameras 104 arranged/mounted on the blimp 102 are activated to scan the airspace 200. The cameras 104 start capturing videos or images of the airspace 200 and shares the video or images with the controller 108 arranged on the ground via the communication device 130.

Upon receipt of the video or images from the cameras 104, the processor 140 analyzes the images to detect a presence of one or more UAVs 300 inside the airspace 200. In an embodiment, in response to the detection of a UAV, for example the UAV 300, inside the airspace 200, the processor 140 by using the machine learning model 146 may generate an image signature of the detected UAV 300 based on the images of the detected UAV 300 extracted from the video or images shared by the cameras 104. Upon generation of the image signature of the detected UAV 300, the machine learning model 146 determines whether the images signature of the detect UAV 300 matches with image signature of any of the authorized UAVs. For so doing, in an embodiment, the machine learning model 146, and hence the controller 108, access the database 144, and compares the image signature of the detected UAV 300 with the image signatures of each of the authorized UAVs. In an embodiment, an image signature includes information about a shape and/or dimensions of the associated UAV. The machine learning model 146, and hence the controller 108, determines or recognizes the detected UAV 300 as the authorized UAV if the image signature of the detected UAV 300 matches with the image signature of any of the authorized UAVs. In an embodiment, two image signatures are determined to match each other if the similarity between two image signature is greater than a predefined value. For example, the two image signatures are determined to match each other if there is more than 90% similarity the two image signatures. In an embodiment, the two image signatures are determined to match each other if there is more than 95% similarity between two image signatures. In an embodiment, the two image signatures are determined to match each other if there is more than 85% similarity between two image signatures.

Accordingly, the controller 108 (i.e., the processor 140), by using the machine learning model 146, determines/recognizes the detected UAV 300 as an unauthorized UAV is the image signature of the detected UAV 300 does not match with the image signatures of any of the authorized UAV. Upon detection of the detected UAV 300 as unauthorized UAV, the machine learning model 146 may store attributes of the detected UAV 300 as unauthorized UAV and may use these attributes for future detection of any unauthorized UAV. In this manner, the machine learning model 146 keeps updating and improving its capability to identify unauthorized UAVs. Furthermore, upon detection of the unauthorized UAV, the processor 140 may generate an alarm, for example, an audible and/or a visual alarm. In some embodiments, the processor 140 may generate a notification and may send the notification to a concerned person or authority. Additionally, the processor 140 may track the movements of the unauthorized UAV in the airspace 200 based on the images received from the cameras 104, and determines an instantaneous location, heading, and the speed of the UAV 300 in the airspace 200. Also, the processor 140 may store a data related to a location of entry of the unauthorized UAV in the airspace 200 with a time stamp and a location of exit of the unauthorized UAV from the airspace 200 with a time stamp. In this manner, the system 100 facilitates in monitoring the airspace 200 for intrusion of any unauthorized UAVs in the airspace 200.

The foregoing descriptions of specific embodiments of the present disclosure have been presented for purposes of illustration and description. They are not intended to be exhaustive or to limit the present disclosure to the precise forms disclosed, and obviously many modifications and variations are possible in light of the above teaching. The exemplary embodiment was chosen and described in order to best explain the principles of the present disclosure and its practical application, to thereby enable others skilled in the art to best utilize the present disclosure and various embodiments with various modifications as are suited to the particular use contemplated.

What is claimed is:

1. An autonomous unmanned aerial vehicle detecting system for monitoring a geographic area, the detecting system comprising:
   an unmanned blimp adapted to hover in air and including
   a balloon shaped structure filled with a gas to enable a lifting of the unmanned blimp,
   a valve to control a discharge of the gas from the balloon shaped structure, and
   a plurality of propellers and a plurality of electric motors to drive the plurality of propellers;
   a solar mesh adapted to generate solar electric power to power the unmanned blimp, the at least one camera, the electric motors, and the location sensor;
   at least one camera mounted on the unmanned blimp and adapted to scan at least a portion of the geographic area wherein the at least one camera is adapted to capture a bird eye view of the geographic area and wherein at least one camera includes a plurality of cameras to capture 360 degrees view of the geographic area surrounding the unmanned aerial vehicle;
   a location sensor disposed on the unmanned blimp and configured to determine a location of the unmanned blimp; and
   a controller arranged in communication with the plurality of electric motors, the valve, the at least one camera, and the location sensor and is configured to:
   control the plurality of electric motors and the valve to move and position the unmanned blimp at a desired location in the air based on inputs received from the location sensor, wherein the desired location includes a desired altitude and the controller controls the valve to discharge the gas from the balloon shaped structure to position the unmanned blimp at the desired altitude,
   monitor the geographic area based on the images received from at least one camera,
   detect a presence of an unmanned aerial vehicle within the geographic area based on the images received from the at least one camera, and
   determine whether the detected unmanned aerial vehicle is an unauthorized unmanned aerial vehicle based on the images received from the at least one camera,
   wherein the controller is configured to:
   generate an image signature of the detected unmanned aerial vehicle from the images received from the at least one camera,
   determine the detected unmanned aerial vehicle as an unauthorized unmanned aerial vehicle based on the generated image signature,
   access the database to access one or more image signatures that are each associated with a respective authorized unmanned aerial vehicle,
   compare, by using a trained machine learning model, the image signature of the detected unmanned aerial vehicle with one or more image signatures that are each associated with a respective authorized unmanned aerial vehicle, and
   identify, by using the trained machine learning model, the detected unmanned aerial vehicle as an unauthorized unmanned aerial vehicle when the generated image signature of the detected unmanned aerial vehicle is different from the plurality of image signatures associated with the plurality of authorized unmanned aerial vehicles,
   wherein the autonomous unmanned aerial vehicle further including a database storing a plurality of image signatures corresponding to a plurality of authorized unmanned aerial vehicles,
   wherein the controller is configured to generate an alarm in response to the determination of the detected unmanned aerial vehicle being an unauthorized unmanned aerial vehicle,
   wherein the controller is located at a ground based central station and the unmanned aerial vehicle detecting system further includes a communication device to share a data from the at least one camera and the location sensor to the controller,
   wherein the controller is configured to determine a location and a velocity of the detected unmanned aerial vehicle based on the images received from the at least one camera.

2. A method for monitoring a geographic area, the method comprising:
   positioning an unmanned blimp at a desired location in the air, wherein the desired location includes a desired altitude, wherein the unmanned blimp includes
   a balloon shaped structure filled with a gas to enable a lifting of the unmanned blimp, a valve to control a discharge of the gas from the balloon shaped structure, wherein positioning the unmanned blimp at the desired location includes controlling, by a controller, the valve to discharge the gas from the balloon shaped structure, and a plurality of propellers and a plurality of electric motors to drive the plurality of propellers; wherein positioning the unmanned blimp at the desired location in the air includes controlling the plurality of motors to move the unmanned blimp based on data received from a location sensor;

scanning, by at least one camera mounted on the unmanned blimp, the geographic area wherein the at least one camera is adapted to capture a bird eye view of the geographic area and wherein at least one camera includes a plurality of cameras to capture 360 degrees view of the geographic area surrounding the unmanned aerial vehicle;

monitoring, by a controller, the geographic area based on the images received from at least one camera;

detecting, by the controller, a presence of an unmanned aerial vehicle within the geographic area based on the images received from the at least one camera;

determining, by the controller, whether the detected unmanned aerial vehicle is an unauthorized unmanned aerial vehicle based on the images received from the at least one camera, wherein determining whether the detected unmanned aerial vehicle is an unauthorized unmanned aerial vehicle includes:

generating an image signature of the detected unmanned aerial vehicle from the images received from the at least one camera, and determining the detected unmanned aerial vehicle as an unauthorized unmanned aerial vehicle based on the generated image signature, wherein determining the detected unmanned aerial vehicle as an unauthorized unmanned aerial vehicle based on the generated image signature includes:

accessing, by the controller, a database to access one or more image signatures that are each associated with a respective authorized unmanned aerial vehicle;

comparing, by the controller via a trained machine learning model, the image signature of the detected unmanned aerial vehicle with one or more image signatures that are each associated with a respective authorized unmanned aerial vehicle; and identifying, by the controller via the trained machine learning model, the detected unmanned aerial vehicle as an unauthorized unmanned aerial vehicle when the generated image signature of the detected unmanned aerial vehicle is different from the plurality of image signatures associated with the plurality of authorized unmanned aerial vehicles;

generating, by the controller, an alarm in response to the determination of the detected unmanned aerial vehicle being an unauthorized unmanned aerial vehicle;

determining a location and a velocity of the detected unmanned aerial vehicle based on the images received from the at least one camera; and controlling, by the controller, a descending of the unmanned blimp by controlling an opening of the valve to control a discharge of the gas from the unmanned blimp.

* * * * *